United States Patent Office 3,740,270
Patented June 19, 1973

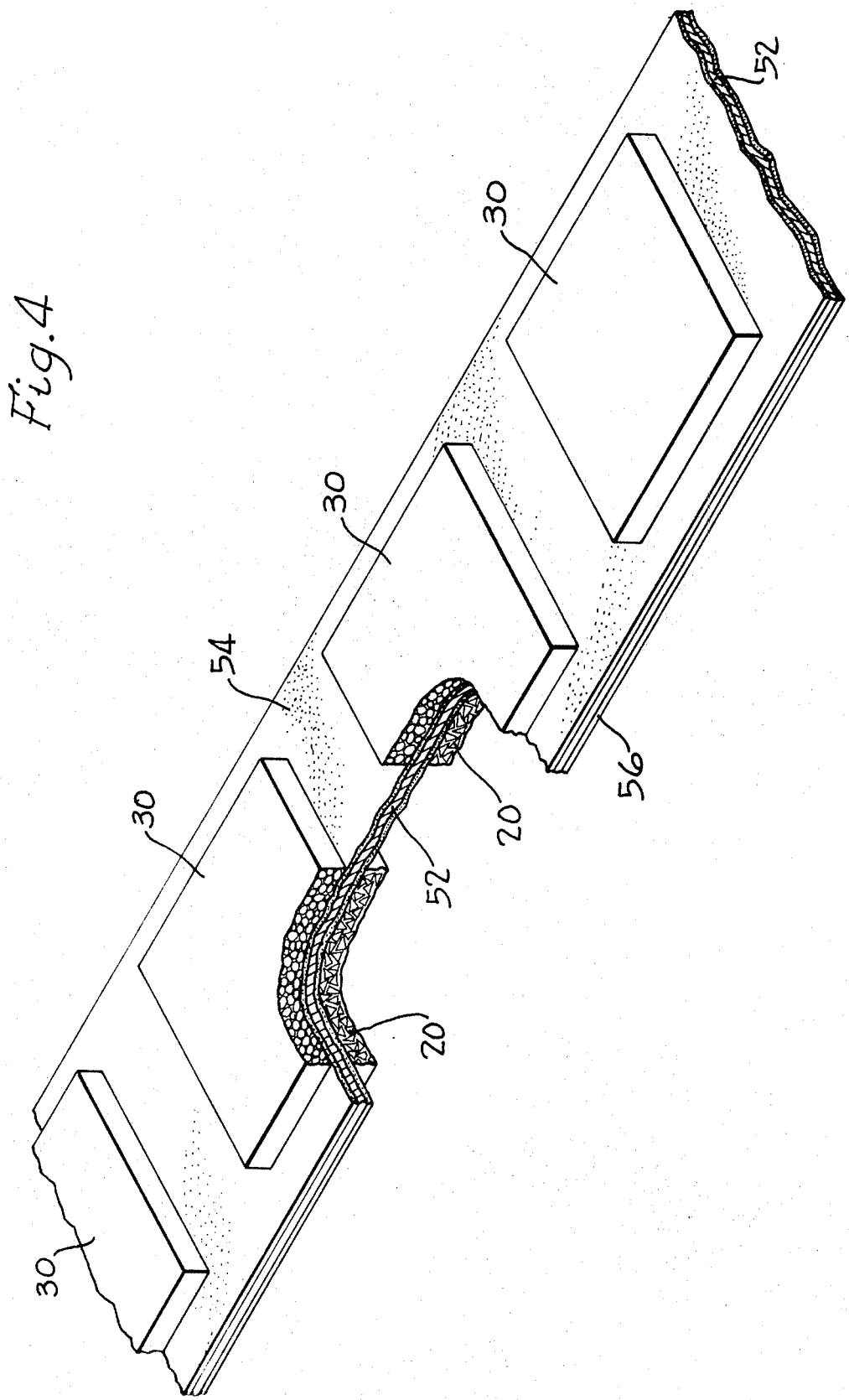

3,740,270
DUPLEX ELECTRODE CONSTRUCTION USING CONTINUOUS METAL CARRIER STRIP COATED ON BOTH SIDES WITH CONDUCTIVE ADHESIVE
John M. Bilhorn, Edgerton, Wis., assignor to ESB Incorporated
Filed Dec. 21, 1970, Ser. No. 100,268
Int. Cl. H01m 21/00
U.S. Cl. 136—111                    11 Claims

ABSTRACT OF THE DISCLOSURE

A duplex electrode is constructed by first coating both sides of a continuous metal carrier strip with electrically conductive adhesive material and then placing intermittent deposits of positive and negative electrodes on opposite sides of the coated carrier strip. The duplex electrode is then assembled into a multicell battery. The assembly preferably occurs while the duplex electrodes are structurally and electrically connected by the continuous carrier strip after which the carrier strip is subsequently cut between duplex electrodes to obtain structurally and electrically unconnected batteries. Alternatively, the carrier strip may be cut between duplex electrodes before these electrodes are assembled into multicell batteries. Preferably, the carrier strip is zinc, aluminum, or steel.

BACKGROUND OF THE INVENTION

(1) Field of the invention

This invention concerns duplex electrodes (also known as bipolar electrodes) in which a continuous metal carrier strip is first coated on both sides with an electrically conductive adhesive and then deposits of positive and negative electrodes are intermittently placed on opposite sides of the coated carrier strip. Both the method and the resultant product are claimed.

(2) Description of the Prior Art

In the construction of multicell batteries, three essential requirements must be met: a member which is impervious to the electrolyte of the battery must be used between consecutive cells to seal one cell from the next; some means must be provided by which electrical current may be conducted between the positive electrode in one cell and the negative electrode in the other cell; and the electrolyte impervious member and the electrical conductor means must not create an undesired reactions in the battery. Other desirable attributes are that there be low electrical resistances between the positive electrode of one cell and the negative electrode of the next cell and that the battery be constructed using inexpensive materials and methods.

One technique for constructing multicell batteries is with the use of duplex electrodes, also known as bipolar electrodes. A duplex electrode is a separately constructed assembly in which an electrolyte impervious, electrochemically nonreactive member which eventually divides one cell from an adjacent cell is surrounded on one side with a positive electrode and on the other side with a negative electrode. After being so assembled, the duplex electrode is subsequently assembled into a multicell battery.

SUMMARY OF THE INVENTION

With this invention, duplex electrodes are constructed first by coating both sides of a continuous metal carrier strip with an electrically conductive adhesive and then by placing intermittent deposits of positive and negative electrodes on the opposite sides of the coated carrier strip. The coated carrier strip meets the requirement of being impervious to electrolyte by providing three layers of liquid impervious materials between two consecutive cells. The coated carrier strip is itself a good electrical conductor, and is therefore capable of conducting current between the positive electrode in one cell and the negative electrode in the adjacent cell. The coating of impervious adhesive on both sides of the metal strip permits the strip to be made from a metal which might otherwise tend to produce unwanted electrochemical reactions within the battery. The conductive adhesive on both sides of the carrier strip causes a bonding or adhesion between the coated carrier strip and the surrounding electrodes, resulting in low electrical resistances between the positive electrode of one cell and the negative electrode of the next cell in the assembled multicell battery. Use of the coated metal carrier strip as a substrate permits the positive and negative electrodes to be made from compositions which, during the construction of the duplex electrode, are unable or poorly suited to be produced as continuous strips.

The positive and negative electrodes are applied in intermittent deposits along the carrier strip with a deposit of positive electrodes being placed opposite a deposit of negative electrodes. During this construction process, the resulting duplex electrodes are structurally and electrically connected together. The structural connection is desirable because high speed production machinery is better able to receive continuous strips of stock than individual pieces. The electrical connection between duplex electrodes is subsequently broken, either (1) by assembling the continuous carrier strips into structurally and electrically connected multicell batteries which are later structurally and electrically unconnected from each other or (2) by cutting the continuous carrier strips into structurally and electrically unconnected segments each of which is a duplex electrode and later assembling the segments into multicell batteries.

Preferably, the metal of the carrier strip is zinc, aluminum, or steel.

BRIEF DESCRIPTION OF THE DRAWINGS

FIG. 4 is an oblique view of a portion of the product resulting from the process of FIG. 1. FIG. 4 shows intermittent deposits of positive and negative electrodes on the opposite sides of the coated metal strip.

DESCRIPTION OF THE PREFERRED EMBODIMENTS

Figure 1:
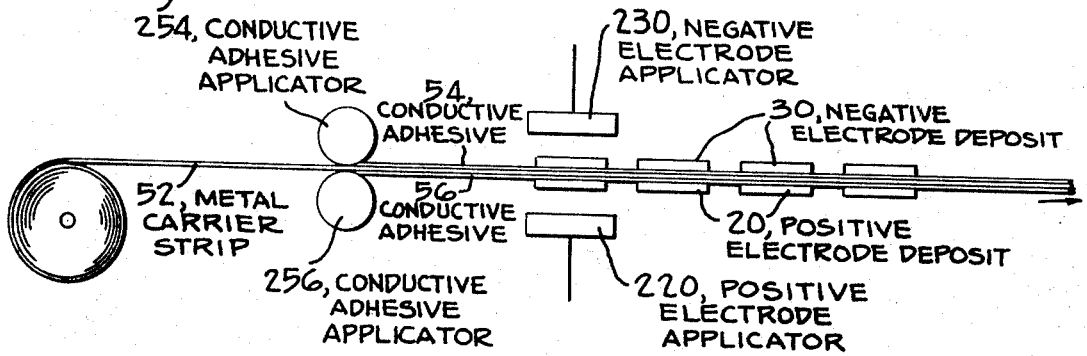
FIG. 1 is a schematic diagram showing a continuous metal carrier strip first being passed by applicators which apply conductive adhesive onto both sides of the metal strip and then being passed by additional applicators which place intermittent deposits of positive and negative electrodes on the opposite sides of the coated metal strip.

FIG. 1 is a schematic diagram showing a continuous metal carrier strip 52 from a roll or some other source of supply 252 being passed by a pair of applicators 254 and 256 which apply coatings of a conductive adhesive 54 and 56, respectively, onto the two sides of the metal carrier strip. The coated metal strip is subsequently passed by positive and negative electrode applicators 220 and 230, respectively, where the applicators place intermittent deposits of positive and negative electrodes 20 and 30, respectively, on opposite sides of the carrier strip from each other. Each deposit of negative electrode is substantially opposite a deposit of positive electrode. The applicators 220 and 230 may be spaced opposite one another so that they make their opposing deposits simultaneously, or they may be spaced apart so that one applicator first makes its deposit and later the other applicator makes the opposing deposit. FIG. 4 shows intermittent deposits of positive and negative electrodes on the opposite sides of the coated metal strip. It will be understood by those skilled in the art that a segment of the carrier strip having a positive and negative electrode on its opposite sides defines a duplex electrode assembly, also known as a bipolar electrode. This invention is not limited to specific electrically conductive adhesive materials, for any electrically conductive adhesive material which can be applied in coatings free of pinholes is acceptable. Such materials include pressure sensitive rubber-based or vinyl-based adhesives which are loaded with carbonaceous materials such as graphite or acetylene black or loaded with metallic powders or flakes or needles of such materials as copper or silver. Alternatively, the adhesive base may be thermosensitive and include such materials as vinyl copolymers and/or rubbers or ethylene vinyl acetate or a mixture of the latter with waxes. Polymers which by themselves are sufficiently conductive may also be used. Likewise, this invention is not limited to the manner in which the coatings of electrically conductive adhesive are applied to the carrier strip, such techniques as printing, rolling, brushing, spraying, or dipping being illustrative of the methods which might be used. The applicators 254 and 256 shown in FIG. 1 are intended to represent conductive adhesive applicators in general. Also, while FIG. 1 shows the coatings of adhesive being applied continuously along both sides of the carrier strip, intermittent coatings may also be used provided the uncoated intermittent segments of the metal strip are, when subsequently assembled into multicell batteries, positioned in the battery so that they are not allowed to come ino communication with the battery's electrolyte.

Just as the applicators 254 and 256 are intended to represent in general all applicating devices which may be used to apply adhesive to the carrier strip, so also the applicators 220 and 230 shown in FIG. 1 are intended to represent in general all applicating devices which may be used to place intermittent deposits of positive and negative electrodes 20 and 30, respectively, along the coated strip.

As can be seen from FIG. 1, the duplex electrode assemblies are structurally and electrically connected together immediately after the carrier strip passes by the second of the two applicators. At some subsequent step in the construction of separate multicell batteries, these physical and electrical connections between duplex electrode assemblies must be broken.

Figure 2:
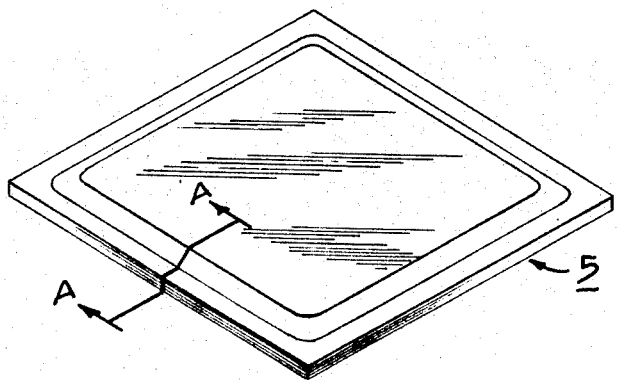
FIG. 2 is an oblique view of a multicell battery containing duplex electrodes made according to this invention.
Figure 3:
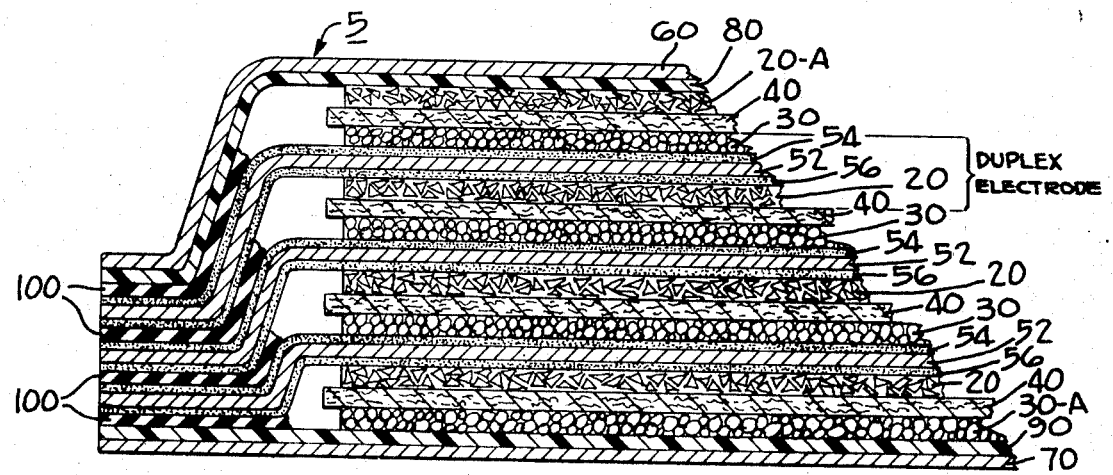
FIG. 3 illustrates a cross-section of the battery shown in FIG. 2 taken along the line A—A of FIG. 2. The thickness of the battery is shown greatly magnified for purposes of illustration.

The eventual multicell battery product is the same whether the duplex electrodes constructed as shown in FIG. 1 are assembled into multicell batteries before or after being structurally and electrically unconnected from each other. FIG. 2 shows such a multicell battery 5 in an oblique view. FIG. 3 shows a portion of the multicell battery 5 in magnified cross-section. As FIG. 3 shows, the battery 5 comprises the combination of an outer positive electrode 20–A, and outer negative electrode 30–A, and at least one duplex electrode between electrodes 20–A and 30–A, each duplex electrode being of the type constructed by the method shown in FIG. 1. As shown in FIG. 3, a duplex electrode comprises the combination of a segment of metal carrier strip 52 coated on both sides with conductive adhesives 54 and 56 which function as the intercell connector of the duplex electrode, together with deposits of positive and negative electrodes 20 and 30, respectively, on the opposite sides of the segment. The multicell battery 5 also includes an electrolyte impregnated separator between each positive electrode 20 or 20–A and each negative electrode 30 or 30–A. Liquid impervious layers 80 and 90 which also function as current conducting means are in contact with the outer electrodes 20–A and 30–A, respectively. Metal current collectors 60 and 70 which also function as vapor barriers are on the outside of layers 80 and 90. Electrolyte impervious sealing means and electrical insulating means around the electrolyte impregnated separators 40 are designated by the numeral 100.

Numerous advantages result from the construction illustrated schematically in FIG. 1 and described above. Use of the carrier strip as a substrate permits the electrodes to be made from compositions which, during the construction of the duplex electrodes, are unable or poorly suited to be produced as continuous strips. Examples of electrodes which are unable or poorly suited to be produced as continuous strips include electrodes comprising particles of active material contained in and dispersed throughout a porous matrix; flame spray deposits; and vapor deposits.

The conductive carrier strip and the adhesive coatings thereon also permits current to be conducted between the positive and negative electrodes in a duplex electrode, that is, between the positive electrode in one cell and the negative electrode in the adjacent cell.

The coated carrier strip also has the advantage of being electrochemically inert in the battery. Metal carrier strips which would be electrochemically nonreactive without the use of nonreactive coatings tend to be excessively expensive, requiring such metals as titanium, tantalum, or gold. Less expensive metals which might be used to construct the strips tend to produce unwanted electrochemical reactions with the positive and/or negative electrodes, but this problem can be overcome by interposing a layer of nonreactive, electrolyte impervious material between each side of such a metal strip and surrounding electrodes. Thus, such metals as zinc, aluminum, and steel when used as carriers and when coated on both sides with electrolyte impervious conductive adhesives, provide intercell members which are well suited for use in the construction of duplex electrodes: they are electrochemically nonreactive, they are electrically conductive, and they are impervious to electrolyte. Besides their relatively low cost, metals such as zinc, aluminum, and steel have other advantages when used for the construction of the carrier strip of this invention; they are good electrical conductors, they can be manufactured in very thin strips which do not have pinholes of excessive size and/or number, and the metal strips can be easily handled by high speed production machinery. Any pinholes which might exist in the metal strips are likely to be covered by the electrolyte impervious coatings of conductive adhesive applied to the two sides of the strip, resulting in added insurance against the intercell leakage of electrolyte.

The conductive adhesives used on both sides of the carrier strip produce bonds or adhesions with the electrodes which result in very low electrical resistance between the positive electrodes on one side of the duplex electrode and the negative electrodes on the other, and so the use of this invention results in multicell batteries having relatively high terminal voltages and relatively low internal power losses.

The use of the continuous carrier strip as a substrate along which intermittent deposits of electrodes are applied is also advantageous from the viewpoint of manufacturing techniques. Modern, high speed production machinery is better able to apply such deposits along a continuous strip than to apply deposits to a succession of individual pieces. Maximum advantage of this principle may be attained in conjunction with this invention by using the continuous strip as a processing implement throughout the construction of the multicell batteries, leaving the step of cutting the carrier strip into segments until all other assembly steps required to construct the multicell batteries have been taken. In this regard, it is preferred to assemble a plurality of structurally and electrically unconnected multicell batteries by beginning with the construction of duplex electrodes which are structurally and electrically connected together along the continuous coated metal carrier strip. This consists of placing intermittent deposits of positive and negative electrodes along the coated carrier strip as shown in FIG. 1 so that each deposit of negative electrode is on the other side of the strip from and substantially opposite a deposit of positive electrode. The next step in the preferred assembly process consists of assembling multicell batteries which are structurally and electrically connected together by at least one of the coated carrier strips having positive and negative electrodes deposited thereon, a step which comprises the acts of: placing at least one such carrier strip between outer positive and outer negative electrodes so that each duplex electrode is between an outer positive electrode and an outer negative electrode; placing an electrolyte impregnated separator between each positive and negative electrode; sealing around the perimeter of each electrolyte impregnated separator to produce a liquid impervious seal; sealing a liquid impervious layer around the electrodes and electrolyte impregnated separators; and, connecting to each outer positive electrode electrically conductive means which extend to the exterior of the liquid impervious layer and connecting to each outer negative electrode additional electrically conductive means which extend to the exterior of the liquid impervious layer. After the multicell batteries have been so assembled, each carrier strip is then cut between duplex electrodes to obtain structurally and electrically unconnected multicell batteries; the carrier strip may be cut between each successive pair of duplex electrodes, or it may be cut into increments each of which contains two or more duplex electrodes so that the resultant batteries structurally connected by the increment are electrically connected in parallel. During the assembly of the multicell batteries, additional members of the multicell batteries may be processed in the form of continuous strips; alternatively, each of these additional members may also comprise a succession of structurally unconnected members placed along the continuous coated metal carrier strip.

FIG. 3 is helpful in illustrating these concepts. The multicell battery 5 shown in FIG. 3 may be made by using three of the coated metal carrier strips 52 with positive and negative electrodes 20 and 30 applied intermittently on the opposite sides of each. The electrolyte impregnated separators 40 shown in FIG. 3 were assembled into the battery as structurally unconnected members. The members 60, 70, 80 and 90 were assembled into the multicell battery 5 as continuous strips, although they also could have been members which have no structural connection with each other when assembled into successive multicell batteries. The cutting of the three coated metal carrier strips plus the cutting of any other continuous strips used in constructing the multicell battery 5 may be the last step in the construction of a plurality of multicell batteries, thereby retaining the advantages of processing continuous strips rather than individual unconnected pieces for as much of the assembly process as is possible.

It is not essential that the cutting of the continuous, coated metal carrier strip into structurally and electrically unconnected duplex electrodes be postponed until all other steps in the assembly of multicell batteries are complete. The cutting of the strips may, for instance, be done immediately after the positive and negative electrodes are applied intermittently on opposite sides of the carrier strips and the unconnected duplex electrodes may then be assembled into multicell batteries. If this sequence of steps is taken, then the assembly of a multicell battery after the cutting of the carrier strip comprises: placing at least one of the structurally and electrically unconnected duplex electrodes between an outer positive electrode and an outer negative electrode; placing an electrolyte impregnated separator between each positive and negative electrode; sealing around the perimeter of each electrolyte impregnated separator to produce a liquid impervious seal; sealing a liquid imperivous layer around the electrodes and electrolyte impregnated separators; and, connecting to the outer positive electrode electrically conductive means which extend to the exterior of the liquid impervious layer and connecting to the outer negative electrode additional electrically conductive means which extend to the exterior of the liquid impervious layer. The unconnected duplex electrodes could be assembled into multicell batteries as described above in a process in which some other member of the finally constructed batteries was used in the form of a continuous carrier strip during some or all of the assembly steps; for instance, the outside layers could be continuous carrier strips and the duplex electrodes, electrolyte impregnated separators, and outer electrodes could then be placed along those continuous strips, with the cutting of those strips to produce structurally unconnected multicell batteries being postponed until after all other assembly steps have been concluded.

The composition of each of several of the members in the battery may take alternative forms, and the compositions of those members will now be discussed.

The positive electrodes 20 and 20-A may each comprise particles of electrochemically positive active material contained in and dispersed throughout a binder matrix. The positive active material conventionally is divided into tiny particles so as to increase the ratio of total surface area to weight in the active material and thereby increase the rate at which the electrochemical reactions can occur by increasing the surface areas where they occur. The binder increases the internal electronic conductivity of the duplex electrode and increases the structural integrity within the positive electrodes. Since electrolyte must have access to the surface of the active material particles, the electrode must be made sufficiently porous so that the electrolyte may diffuse throughout the electrode rapidly and thoroughly. Preferably, the pores in the electrode are produced by the evaporation of liquid during the construction of the electrode; the evaporating liquid may be part of a dispersion binder system in which the solid binder contained in the finally constructed electrode is dissolved in the liquid which is later evaporated. The porosity of the positive electrodes may be increased as the discharge rate desired in the battery is increased. Electrodes may also be constructed using combinations of the dispersion and solution systems. Alternatively, the pores might be produced by the dissolving of a solid which was present during construction of the electrode or by passing gases through or generating gases within the electrodes at controlled rates during electrode construction. The positive electrodes 20 and 20-A may, and preferably will, also contain amounts of a good electrical conductor such as carbon or graphite to improve the electrical conductivity between the active material particles, the positive active material particles themselves generally being relatively poor conductors of electricity. The conductivity of the active material particles together with the conductivity of the binder itself will influence the amounts of conductors added to the electrode. The electrodes 20 and 20-A may also contain, if desired, small amounts of additional ingredients used for such purposes as maintaining uniform dispersion of active material particles during electrode construction, aiding the diffusion of electrolyte through the pores of the finally constructed electrodes, controlling viscosity during processing, controlling surface tension, controlling pot life, or for other reasons.

The negative electrodes 30 and 30-A may comprise spray or vapor deposits of metals or may comprise tiny particles of metals contained in and dispersed throughout a binder matrix. If the negative electrodes utilize a binder matrix, in general the same considerations regarding that matrix apply to the negative electrodes as do for the positive electrodes except that no electrical conductor may be needed to achieve desired electrical conductivity between the active material particles since the negative active materials are generally better conductors than are the positive materials. When the negative electrodes utilize a binder matrix, the binder system need not be the same as the one used in the positive electrodes, and even if it is, proportions of binder, active material particles, and other ingredients in the negative electrodes may have a different optimum than the proportions of analogous ingredients in the positive electrode. The initial porosity of the negative electrodes may sometimes be less than that of the positive electrodes, since the negative electrode discharge reaction products are sometimes dissolved in the battery electrolyte. The porosity of the negative electrodes may be increased as the discharge rate desired in the battery is increased. The negative electrodes 30 and 30-A may also comprise thin sheets or foils of electrochemically negative material.

It is apparent that electrodes which comprise particles of active material would be unable or poorly suited to be produced as continuous strips. They should therefore be deposited upon a substrate which, in the case of this invention, is the coated metal carrier strip.

Between each positive electrode 20 or 20-A and each negative electrode 30 or 30-A is an electrolyte impregnated separator 40, the theoretical requirements of which are that it contain electrolyte as well as physically separate and prevent contact between the surrounding electrodes. A deposit of gelled electrolyte could be itself serve both functions if of proper thickness and/or consistency. The alternative construction uses a deposit of gelled or fluid electrolyte with a separator which is distinct from and in addition to the electrolyte, the separator providing added insurance against direct contact between the electrodes and acting as an absorbent material into which the electrolyte may be impregnated. Both alternative constructions may, however, be viewed as being forms of electrolyte impregnated separators. Where the separator is distinct from and in addition to the electrolyte, the separator may be made from a wide variety of materials including the fibrous and cellulosic materials which are conventional in battery construction as well as from woven or non-woven fibrous materials such as polyester, nylon, polypropylenes, polyethylene and glass.

Another essential of the multicell battery 5 is a liquid impervious layer comprising members 80 and 90 sealed around the electrodes and electrolyte impregnated separators as shown in FIG. 3. When a battery is in storage waiting to be placed into service there is an opportunity for liquids from the electrolyte to escape from the battery, leaving the battery incapable of performing as desired when later placed into use. Also during discharge the battery may produce liquid byproducts which are corrosive, poisonous, or otherwise harmful, and it is desirable to prevent these liquids from escaping from the battery. The liquid impervious layer provides means for preventing or minimizing the loss of these liquids.

The multicell battery 5 must also be provided with means for conducting electrical current between the outer positive electrode 20-A and the exterior of the liquid impervious layer and additional means for conducting electrical current between the outer negative electrode 30-A and the exterior of the liquid impervious layer. This additional requirement of the battery may be met by the liquid impervious layer members 80 and 90 themselves by constructing those members from a conductive material such as an electrochemically inert, electrically conductive plastic, and such a construction is shown in FIG. 3. As an alternative to the conductive plastic, metals which are either themselves electrochemically nonreactive or are made so by appropriate conductive, nonreactive coatings may be used for the liquid impervious layer. Another alternative construction not illustrated in the drawings is to use a liquid impervious layer which is made from an electrically nonconductive material and then extend separate conductive means from the end electrodes 20-A and 30-A through or around the edge of the nonconductive, liquid impervious layer so that current may be withdrawn from the battery. It is to be understood that all of these alternative constructions are encompassed by the general statement that a liquid impervious layer is sealed around the electrodes and electrolyte impregnated separators, that electrically conductive means are connected to the outer positive electrode 20-A which extend to the exterior of the liquid impervious layer, and that additional electrically conductive means are connected to the outer negative electrode 30-A which extend to the exterior of the liquid impervious layer.

Two additional components, members 60 and 70, are shown in FIG. 3 and are illustrated because they may be used in the construction of the multicell battery produced by this invention. It should be understood, however, that the present invention does not require the use of members 60 and 70. Those members are metal foils or sheets, e.g., steel foil, which function both as vapor barriers to prevent evaporation of electrolyte from the battery and as current collecting means. Where a nonmetallic, nonconductive vapor barrier is used instead of steel foil, additional means must be provided to conduct current from the exterior of the liquid impervious layer (members 80 and 90) to the exterior of the vapor barrier. Where vapor barriers such as the memebrs 60 and 70 shown in FIG. 3 are used with the battery, they may be laminated to the liquid impervious layers 80 and 90 if desired.

Electrically nonconductive, moisture impervious means must be provided around the peripheral faces of the carrier strip segments to prevent electrolyte loss from the battery and to prevent the electrolyte of one cell from migrating to another cell around the perimeter of an intercell connector. Such sealing means are generally represented by the sealers 100 shown in FIG. 3, but this invention is otherwise not concerned with those sealers.

While it is preferred to employ the Le Clanche electrochemical system (comprising manganese dioxide positive active material, zinc negative active material, and an electrolyte comprising ammonium chloride and/or zinc chloride), the multicell battery 5 of this invention may employ a wide variety of positive and negative electrode materials and wide variety of electrochemical systems including both primary and secondary systems. Among the positive electrode materials are such commonly used inorganic metal oxides as manganese dioxide, lead dioxide, nickel oxyhydroxide, mercuric oxide and silver oxide, inorganic metal halides such as silver chloride and lead chloride, and organic materials capable of being reduced such as dinitrobenzene and azodicarbonamide compounds. Among the negative electrode materials are such commonly used metals as zinc, aluminum, magnesium, lead, cadmium, and iron. This invention may employ the electrolytes commonly used in the Le Clanche system (ammonium chloride and/or zinc chloride), various alkaline electrolytes such as the hydroxides of potassium, sodium, and/or lithium, acidic electrolytes such as sulfuric or phosphoric acid, and nonaqueous electrolytes, the electrolytes of course being chosen to be compatible with the positive and negative electrodes.

Among the wide variety of electrochemical systems which may be used in the multicell battery 5 are those in which the positive electrodes comprise manganese dioxide, the negative electrodes comprise metals such as zinc, aluminum, or magnesium, and the electrolyte substantially comprises an acidic solution of inorganic salts. Another commonly known system useful in the battery 5 is the alkaline manganese system in which the positive electrodes comprise zinc, and the electrolyte substantially comprises a solution of potassium hydroxide. Other aqueous electrolyte systems including those of nickel-zinc, silver-zinc, mercury-zinc, mercury-cadmium, and nickel-cadmium may also be used. Systems employing organic positive electrodes and acidic electrolytes may also be used, including rechargeable systems using azodicarbonamide compound electrodes and Le Clanche electrolyte.

I claim:
1. The method of constructing structurally and electrically connected duplex electrodes along a continuous electrically conductive metal carrier strip which has been coated on both sides with an electrically conductive adhesive, the metal strip with its adhesive coatings thereon being impervious to moisture, each duplex electrode comprising a segment of the coated strip, a positive electrode on one side of that segment, and a negative electrode on the other side of that segment, the method comprising the steps of:
  (a) placing intermittent deposits of a positive electrode along the adhesive coating on one side of the metal carrier strip so as to cause those deposits to be adhered to that adhesive; and,
  (b) placing intermittent deposits of a negative electrode along the adhesive coating on the other side of the metal carrier strip so as to cause those deposits to be adhered to that adhesive, each deposit of negative electrode being on the other side of the coated strip from and substantially opposite a deposit of positive electrode,
  the method being further characterized by using a metal strip having metal surfaces which, if not coated with the adhesives, would be electrochemically reactive with respect to the positive or negative electrode when in the presence of battery electrolyte.

2. The method of claim 1 in which the metal used for the carrier strip is selected from the group consisting of zinc, aluminum, and steel.

3. The method of constructing structurally and electrically unconnected multicell batteries comprising the steps of:
  (a) constructing duplex electrodes which are structurally and electrically connected together along a continuous electrically conductive metal carrier strip which has been coated on both sides with an electrically conductive adhesive, the metal strip with its adhesive coatings thereon being impervious to moisture, each duplex electrode comprising a segment of the coated strip, a positive electrode on one side of that segment, and a negative electrode on the other side of the segment, the method of constructing the duplex electrodes comprising the steps of
    (i) placing intermittent deposits of a positive electrode along the adhesive coating on one side of the metal carrier strip so as to cause those deposits to be adhered to that adhesive, and
    (ii) placing intermittent deposits of a negative electrode along the adhesive coating on the other side of the metal carrier strip so as to cause those deposits to be adhered to that adhesive, each deposit of negative electrode being on the other side of the coated strip from and substantially opposite a deposit of positive electrodes; then
  (b) assembling multicell batteries which are structurally and electrically connected together by the coated carrier strip having positive and negative electrodes deposited thereon, the method of assembling the multicell batteries comprising the steps of
    (i) placing the coated carrier strip with the positive and negative electrodes deposited thereon between outer positive electrodes and outer negative electrodes so that each duplex electrode is between an outer positive electrode and an outer negative electrode,
    (ii) placing an electrolyte impregnated separator between each positive and negative electrode,
    (iii) sealing around the perimeter of each electrolyte impregnated separator to produce a liquid impervious seal,
    (iv) sealing a liquid impervious layer around the electrodes and electrolyte impregnated separators, and
    (v) connecting to each outer positive electrode electrically conductive means which extend to the exterior of the liquid impervious layer and connecting to each outer negative electrode additional electrically conductive means which extend to the exterior of the liquid impervious layer; and then,
  (c) cutting the carrier strip between duplex electrodes to obtain structurally and electrically unconnected multicell batteries.

4. The method of claim 3 in which the metal used for the carrier strip is selected from the group consisting of zinc, aluminum, and steel.

5. The method of constructing a multicell battery comprising the steps of:
  (a) constructing duplex electrodes which are structurally and electrically connected together along a continuous electrically conductive metal carrier strip which has been coated on both sides with an electrically conductive adhesive, the metal strip with its adhesive coatings thereon being impervious to moisture, each duplex electrode comprising a segment of the coated strip, a positive electrode on one side of that segment, and a negative electrode on the other side of that segment, the method of constructing the duplex electrodes comprising the steps of
    (i) placing intermittent deposits of a positive electrode along the adhesive coating on one side of the metal carrier strip so as to cause those deposits to be adhered to that adhesive, and
    (ii) placing intermittent deposits of a negative electrode along the adhesive coating on the other side of the metal carrier strip so as to cause those deposits to be adhered to that adhesive, each deposit of negative electrode being on the other side of the coated strip from and substantially opposite a deposit of positive electrode; then
  (b) cutting the carrier strip between duplex electrodes to obtain structurally and electrically unconnected duplex electrodes; and then,
    (i) placing at least one of the structurally and electrically unconnected duplex electrodes between an outer positive electrode and an outer negative electrode,
    (ii) placing an electrolyte impregnated separator between each positive and negative electrode,
    (iii) sealing around the perimeter of each electrolyte impregnated separator to produce a liquid impervious seal,
    (iv) sealing a liquid impervious layer around the electrodes and electrolyte impregnated separators, and
    (v) connecting to the outer positive electrode electrically conductive means which extend to the exterior of the liquid impervious layer and connecting to the outer negative electrode additional electrically conductive means which extend to the exterior of the liquid impervious layer.

6. The method of claim 4 in which the metal used for the carrier strip is selected from the group consisting of zinc, aluminum, and steel.

7. A multicell battery comprising the combination of:
  (a) an outer positive electrode;
  (b) an outer negative electrode;
  (c) at least one duplex electrode between the outer positive and negative electrodes, each duplex electrode comprising the combination of
    (i) a segment of electrically conductive metal carrier strip coated on both sides with conductive adhesive, the metal strip with its adhesive coatings thereon being impervious to moisture.

(ii) a deposit of positive electrode adhered to the conductive adhesive on one side of the segment, and (iii) a deposit of negative electrode adhered to the conductive adhesive on the other side of the segment;

(d) an electrolyte impregnated separator between each positive and negative electrode;

(e) a liquid impervious layer sealed around the electrodes and electrolyte impregnated separators;

(f) means for conducting electrical current between the outer positive electrode and the exterior of the liquid impervious layer and additional means for conducting electrical current between the outer negative electrode and the exterior of the liquid impervious layer; and, (g) means around the perimeter of each electrolyte impregnated separator for producing a liquid impervious seal.

8. The multicell battery of claim 7 in which the metal strip in the duplex electrode is selected from the group consisting of zinc, aluminum, and steel, the positive electrodes comprise manganese dioxide active material, the negative electrodes comprise zinc active material, and the electrolyte comprises ammonium chloride and/or zinc chloride.

9. The method of constructing multicell batteries using a continuous electrically conductive metal carrier strip which has been coated on both sides with an electrically conductive adhesive, the metal strip with its adhesive coatings thereon being impervious to moisture, the carrier strip having a plurality of intermittent deposits of positive electrodes each of which is adhered to one of the conductive adhesive coatings and the carrier strip also having a plurality of intermittent deposits of negative electrodes each of which is also adhered to one of the conductive adhesive coatings, each deposit of negative electrode being on the other side of the metal carrier strip from and substantially opposite a deposit of positive electrode, the method comprising the steps of:

(a) placing the coated carrier strip with the positive and negative electrodes deposited thereon between outer positive electrodes and outer negative electrodes so that a positive electrode on the carrier strip faces an outer negative electrode and so that a negative electrode on the carrier strip faces an outer positive electrode;

(b) placing an electrolyte impregnated separator between each electrode deposit on the carrier strip and the outer electrode facing it;

(c) sealing around the perimeter of each electrolyte impregnated separator to produce a liquid impervious seal; and, (d) connecting to each outer positive electrode electrically conductive means which extend to the exterior of the liquid impervious layer and connecting to each outer negative electrode additional electrically conductive means which extend to the exterior of the liquid impervious layer.

10. The method of claim 9 in which the carrier strip is subsequently cut between the intermittent deposits along the carrier strip to obtain structurally and electrically unconnected multicell batteries.

11. The method of constructing multicell batteries using a continuous electrically conductive metal carrier strip which has been coated on both sides with an electrically conductive adhesive, the metal strip with its adhesive coatings thereon being impervious to moisture, the carrier strip having a plurality of intermittent deposits of positive electrodes each of which is adhered to one of the conductive adhesive coatings and the carrier strip also having a plurality of intermittent deposits of negative electrodes each of which is also adhered to one of the conductive adhesive coatings, each deposit of negative electrode being on the other side of the metal carrier strip from and substantially opposite a deposit of positive electrode, the method comprising the steps of:

(a) cutting a segment from the coated carrier strip which segment contains at least one pair of opposed positive and negative electrodes, that pair of opposed positive and negative electrodes and the segment of coated carrier strip between them comprising a duplex electrode;

(b) placing the duplex electrode between an outer positive electrode and an outer negative electrode so that the positive electrode of the duplex electrode faces the outer negative electrode and so that the negative electrode of the duplex electrode faces the outer positive electrode;

(c) placing an electrolyte impregnated separator between each of the electrodes of the duplex electrode and the outer electrodes which they face;

(d) sealing liquid impervious layers around the duplex and outer electrodes so that they are surrounded by a liquid impervious seal; and, (e) connecting to the outer positive electrode electrically conductive means which extend to the exterior of the liquid impervious layers and connecting to the outer negative electrode electrically conductive means which extend to the exterior of the liquid impervious layers.

References Cited

UNITED STATES PATENTS

| | | | |
|---|---|---|---|
| 3,565,694 | 2/1971 | Chireau | 117—216 |
| 3,620,933 | 11/1971 | Grunwald | 117—212 |
| 3,508,694 | 4/1970 | Gruber | 136—83 R |
| 3,563,805 | 2/1971 | Deierhoi, Jr. | 136—111 |
| 3,081,369 | 3/1963 | Coleman et al. | 136—111 |
| 2,971,999 | 2/1961 | Jacquier | 136—111 |
| 3,004,093 | 10/1961 | Richter et al. | 136—111 |
| 2,870,235 | 1/1959 | Soltis | 136—111 |
| 3,416,540 | 12/1968 | Lidums | 136—111 |

ALLEN B. CURTIS, Primary Examiner

C. F. LE FEVOUR, Assistant Examiner

U.S. Cl. X.R.

136—10, 17